US012634348B2

(12) United States Patent
    Sanders et al.

(10) Patent No.: US 12,634,348 B2
(45) Date of Patent: May 19, 2026

(54) PLATFORM AND METHOD FOR AUTOMATED DEVICE MANAGEMENT AND INFRASTRUCTURE SERVICING

(71) Applicant: CELLULAR SOUTH, INC., Ridgeland, MS (US)

(72) Inventors: Jeremy Sanders, Hoover, AL (US); Jason Barbee, Fairhope, AL (US)

(73) Assignee: CELLULAR SOUTH, INC., Ridgeland, MS (US)

( * ) Notice: Subject to any disclaimer, the term of this patent is extended or adjusted under 35 U.S.C. 154(b) by 33 days.

(21) Appl. No.: 18/480,599

(22) Filed: Oct. 4, 2023

(65) Prior Publication Data
     US 2025/0119454 A1      Apr. 10, 2025

(51) Int. Cl.
     *G06F 15/173*      (2006.01)
     *H04L 9/40*        (2022.01)
     *H04L 41/0806*     (2022.01)

(52) U.S. Cl.
     CPC .......... *H04L 63/20* (2013.01); *H04L 41/0809* (2013.01); *H04L 63/102* (2013.01)

(58) Field of Classification Search
     None
     See application file for complete search history.

(56) References Cited

U.S. PATENT DOCUMENTS

| | | | |
|---|---|---|---|
| 8,621,211 B1 | 12/2013 | Kishore et al. | |
| 10,911,374 B1 | 2/2021 | Kumar et al. | |
| 11,175,964 B2 | 11/2021 | Jaeger et al. | |
| 2002/0147974 A1 | 10/2002 | Wookey | |
| 2020/0250009 A1* | 8/2020 | Jaeger ................. | G06F 9/5077 |
| 2020/0403821 A1 | 12/2020 | Dev et al. | |
| 2021/0392135 A1* | 12/2021 | Rao ..................... | H04L 41/0894 |
| 2022/0006842 A1* | 1/2022 | Wadhwa ................ | H04L 63/20 |
| 2023/0106531 A1* | 4/2023 | Henkel ................ | G06F 9/5072 |
| | | | 709/223 |

* cited by examiner

*Primary Examiner* — Wing F Chan
*Assistant Examiner* — Andrew Woo
(74) *Attorney, Agent, or Firm* — STEPTOE LLP; Scott M. Richey

(57) ABSTRACT

A network management platform can include a configuration management database (CMDB), an IP address management (IPAM) network device, a network security platform, and a software-defined wide area network (SDWAN). The CMDB can be configured to store configuration data of endpoint devices. The IPAM can allocate IP addresses within the network. The network security platform can be configured to enforce policies and/or manage endpoint access. The SDWAN can be utilized to configure and/or control the endpoint devices.

10 Claims, 8 Drawing Sheets

100

Launch Deck                                    101

Applications                                   102

User          109

Authorization          103          Messaging          104

SDWAN          105          Orchestrator          106

Endpoints          107          User Network          108

300

| 301 Add SDWAN device | 302 Add device to PnP portal | 303 Import SUDI | 304 Sync | 305 Attach template |

PLATFORM AND METHOD FOR AUTOMATED DEVICE MANAGEMENT AND INFRASTRUCTURE SERVICING

TECHNICAL FIELD

The present invention relates generally to device management, and more particularly, to an automated system and method for managing and ensuring security in the deployment of remote devices, such as routers, sensors, traffic lights, radars, cameras, and other endpoint devices, on a network.

BACKGROUND

Traditional network management is fragmented and often requires domain expertise to effectively manage and secure remote devices. Civil engineers who typically oversee certain network devices, such as roadway networks, often do not possess the required expertise to manage intricate network and security concerns. Furthermore, the current solutions are cumbersome and lack the necessary automation.

SUMMARY

An aspect can include a platform having a configuration management database, an IP address management network device, a network security platform, and a software-defined wide area network. The configuration management database can be configured to store configuration data. The IP address management network device can be configured to allocate IP addresses within a network. The network security platform can be configured to enforce policies and/or manage endpoint access.

Embodiments can include an endpoint and a router. The router can communicatively connect, directly or indirectly, the endpoint to the platform. Embodiments can include a private network. The platform can be configured to provide a private IP handoff to the private network.

In some embodiments, the software-defined wide area network can be communicatively connected to the configuration management database and/or an endpoint. The connection can be direct or indirect. The software-defined wide area network can configure the endpoint and/or update a configuration of the endpoint. The configuration can be based on a template.

In some embodiments, the configuration management database can include an immutable ledger.

Another aspect can include an integrated network management system. The system can include a CMDB, an IPAM, a security component, an SDWAN, and a user interface. The CMDB can be configured to serve as a repository for endpoint configuration data. The IPAM component can be configured to manage and/or allocate IP addresses within the network. The security component can include an identity services engine. The engine can be configured to enforce network security policies and/or to manage user and/or device access to the network. The SDWAN component can be configured to intelligently route traffic across the network based on, e.g., predefined policies. The user interface can be configured to provide a user with the ability to deploy endpoints and manage the network. The CMDB, the IPAM component, the identity services engine, the SDWAN component, and the user interface can all be seamlessly integrated to create a unified, automated platform. Such platform can allow for efficient network deployment and management by a user, such as a civil engineer.

Yet another aspect can include a system for network device provisioning. The system can include a web frontend, a frontend API, a message queuing layer, a CMDB, a relational database, a plug-and-play (PnP) portal, and/or an orchestrator. The web frontend can initiate a provisioning routine. The frontend API can interface the web frontend with a processing layer or a series of processing layers. The message queuing layer can facilitate asynchronous communication between processing layers. The CMDB can be configured to storing site, contact, role, and/or device data. The relational database can be configured to manage the CMDB. The plug-and-play portal can be configured to manage device inventory. The orchestrator can be configured to control a network management system (NMS), handling commands and/or responses between the PnP portal and/or the NMS. The NMS can be configured to manage network configurations. The CMDB orchestrator can be configured to coordinate data between the CMDB and the PnP portal.

Embodiments can include a web frontend having a graphical user interface. The web frontend can be configured for selecting a site and/or associating contacts and/or roles with the site. Such can be based on user input.

Some embodiments can include a finisher. A finisher module can be operatively connected to a web frontend. The finisher can be configured to finalize device provisioning. Finalization can include generating and/or associating IP addresses with a network interface of a device. A finisher module can include means for marking a device in the CMDB as provisioned.

In other embodiments, a message queuing layer can be configured to publish and subscribe to various event topics. A system can include an event log reader, which can be operatively connected to a web frontend to, for example, monitor provisioning events in real time. The event log reader can be adapted to output a signal that can indicate, among other things, when provisioning is complete.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

Figure 1:
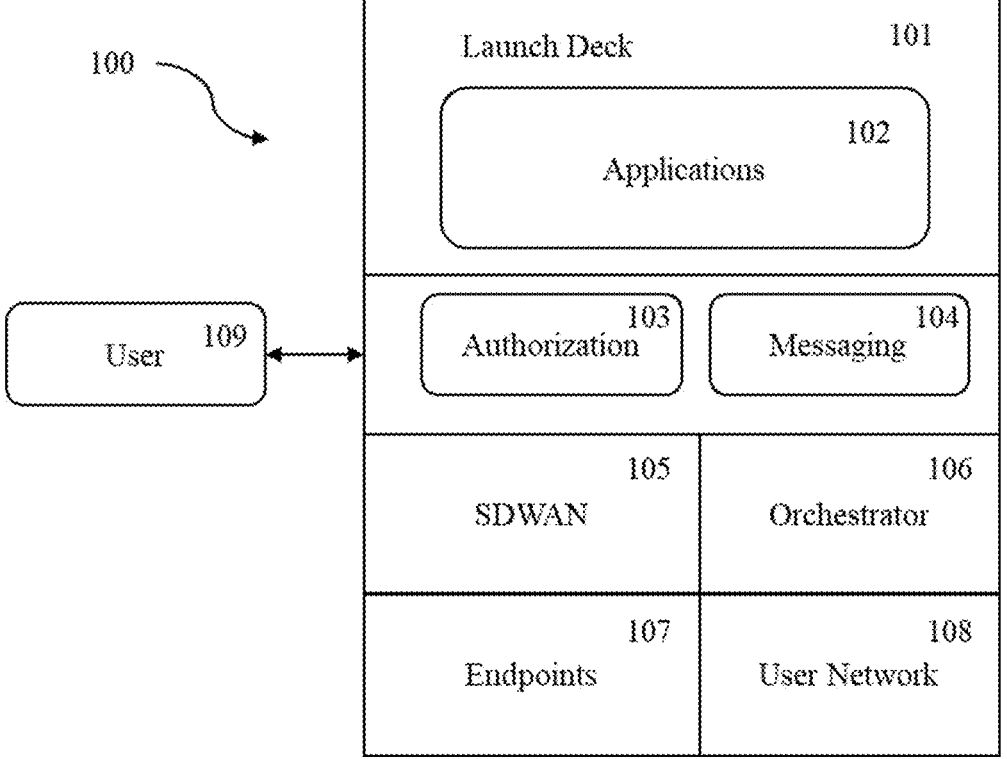
FIG. 1 illustrates an exemplary system architecture.

A detailed explanation of the system, method, and exemplary embodiments of the present invention are described below. Exemplary embodiments described, shown, and/or disclosed herein are not intended to limit any claim, but rather, are intended to instruct one of ordinary skill in the art as to various aspects of the invention and how to make and use the same. Other embodiments can be practiced and/or implemented without departing from the scope and spirit of the invention. Embodiments described herein can be implemented through ground-up development. But as will be clear from the discussion below, various open source and proprietary tools, products, etc., can be advantageously integrated for several purposes, such as efficiency and developer preference, needs, or requirements. Accordingly, certain embodiments below are discussed in connection with available technology to convey a full description to the ordinarily skilled artisan, to suggest preferred technologies for those aspects of the embodiments where developmental efficiency can be gained, and/or for convenient aids. No reference to any third-party technology, however, is intended to limit the scope of the claims, the spirit of the invention, or any embodiment to such specifically reference products, tools, etc.

Technology is required to meet business outcomes in nearly every industry today. In some instances, there are too few IT professionals to meet the demand and the speed required by modern organizations. In other instances, given the rapid increase in edge devices and IoT, dedicating IT professionals to directly interact with remote endpoints is impractical. Often the result is unreliable, insecure, and non-compliant networking deployed by non-technologically skilled people. Management and updating of remote devices in particular present several challenges, including device authentication, provisioning, and security. Such can require extensive IT skills that are not typically within the competency of, e.g., civil engineers who often deploy devices at remote locations. Additionally, existing systems can be complex and not user-friendly for frontline workers to manage without IT knowledge.

One objective herein is to simplify deployment and management of complex technology solutions through self-service automation, reducing IT bottlenecks and improving various aspects of the overall system. In one aspect, an automation platform can enable scaling customer adoption without a linear scale of labor cost, as well as provide faster adoption, shorter buyer cycles, and enhanced customer satisfaction. Some key features of the platform can include automation, connectivity, and security. Moreover, the platform can be implemented across industries and use cases, such as roadways, fleet, and teleworkers. Embodiments can pertain to a technology system specifically designed to cater to the needs of the end user. In the realm of such systems, traditional designs have often targeted network engineers or other computer science professionals, neglecting the unique needs of the field-based end users. In stark contrast, the current invention addresses this significant gap by focusing its functionality on the user category.

According to some embodiments, the system can be utilized to deploy and maintain endpoints. An endpoint can be a tangible apparatus equipped to interface with and facilitate the exchange of data within a computerized network system. Such endpoints can manifest in various forms including, but not limited to, mobile electronic apparatuses, stationary desktop computing systems, virtualized machine constructs, embedded hardware configurations, and centralized server mechanisms. Moreover, in the realm of the Internet-of-Things (IoT), devices such as optical surveillance units, luminescent fixtures, domestic cooling appliances, security apparatuses, intelligent auditory playback devices, and climate regulation units can be identified as endpoints. Other endpoints can include traffic signals, roadway communication signs, smart billboards, and other remote electronic systems. Analogous to a telephonic dialogue between two individuals, the dynamic of data transmission between a remote device and a network represents a bi-directional exchange reminiscent of a conversational interaction.

To actualize the goal of creating an end-user-centric system, certain embodiments can integrate a configuration management database (CMDB) and IP address management (IPAM) network device functions within a launch deck system. These elements can be designed to be client-specific, thus offering a high degree of personalization based on the unique needs of each end user. This tailored approach can provide a more intuitive user interface and a smoother workflow, making it easier for the end users to handle tasks typically reserved for IT professionals. The CMDB can provide an organized view of all the information related to the registered endpoints, while the IPAM can manage and track the IP addresses used by endpoints.

At a high level, a system can integrate a Software-Defined Wide Area Network (SDWAN) as the underlying technology and a launch deck as the control panel that facilitates setting up, overseeing, and fine-tuning the SDWAN and networked components. The SDWAN can create a virtual WAN architecture that allows organizations to leverage any combination of transport services, including MPLS, LTE, and broadband internet services. It can use software to control the connectivity, management, and services between data centers and remote devices and/or cloud instances. The SDWAN can connect different parts of an organization (like remote devices, endpoints, data centers, and the cloud) over a WAN in a secure, efficient, and dynamic manner. The SDWAN can provide capabilities like dynamic path selection, secure data transmission over the public internet, application-aware routing, and more. The launch deck can be a management platform. It can be an application or platform that provides centralized management, monitoring, and orchestration for SDWAN deployments.

A launch deck can serve as the control center or administrative interface for SDWAN solutions. It can allow users to manage and get insights into the SDWAN network. Through such platforms, users can define policies, set up connectivity rules, monitor network health, and troubleshoot any potential issues. The launch deck can offer a bird's-eye view of the entire network, enabling easy configuration, monitoring, and management of the SDWAN infrastructure.

Another aspect involves automating both connectivity and security to the edge for the non-technical end user. This can be accomplished by incorporating orchestrators working in the background, maintaining system functionality and managing the complex tasks involved in provisioning, deploying, and securing the devices, and thus supporting automated connectivity and robust security, extending these capabilities to the end user located at the edge of the network. This background operation can streamline the user experience, rendering complex procedures manageable for field personnel.

One embodiment of the automated process in essence can be described as follows. When a device, e.g., a camera, is plugged into the system, its access and functionality on the network are determined based on pre-set conditions and the information the engineer provides when registering the device. Authentication is performed using the SDWAN component, which evaluates if the device should be allowed network access. Once permitted, a MAC address bypass authentication method is employed to verify the router's credentials, ensuring secure and automated network access.

Embodiments present a technology system that serves as a strategic asset, helping organization to effectively navigate the challenges of an evolving digital landscape. A competitive advantage lies not only in the unique designs but also in the developmental methodologies. For example, insights gained from firsthand field experiences, including exposure to various environmental conditions, can inform design and functionality. A level of understanding and commitment to serving end users' needs can be advantageously leveraged to improve the system.

FIG. 1 illustrates a representative embodiment of a system architecture (100) that facilitates robust communication and operational capabilities. Various other hardware, software, and system architectures can be employed. The exemplary embodiment can offer a comprehensive framework to house, manage, and facilitate a multitude of functionalities, ranging from application hosting to secure communication and orchestration, all nested within a hierarchical, interconnected structure. The system can include a launch deck (101), which can host a plethora of applications (102) such as, but not limited to, various networking tools, security protocols, provisioning mechanisms, CMDBs, protective firewalls, secure vaults, an application programming interface (API) portal, ingress mechanisms, database systems like PostgreSQL, and cross-plane coordination platforms. Users (109) can interact with the system via an authorization and messaging layer. This layer can encapsulate the functions of user validation and intersystem communication. The authorization sub-component (103) can employ a preferred protocol such as, for example, services like Auth0 to authenticate and validate user credentials, ensuring that only authorized users can access the system's functionalities. Concurrently, the messaging sub-component (104) can operate as the backbone for all pertinent communication processes among the integrated applications, authorization modules, the user interface, orchestrators (106), and an SDWAN (105). This messaging platform (104) can be implemented with an immutable ledger, thereby bolstering the integrity, transparency, and traceability of all communication operations.

The SDWAN (105) can be configured to manage endpoints (107). The SDWAN and separate orchestrator (106) can offer dynamic path selection, centralized management, and orchestration of multiple underlying functionalities and protocols. The system can optionally include a user network component (108) that can be segregated from the various components of the system, such as the orchestrator. For heightened flexibility and scalability, the SDWAN, orchestrator, and user network components can be designed to be cloud-native, allowing them to harness the agility, resilience, and scalability inherent in cloud infrastructures. The SDWAN, orchestrator, endpoints, and user network can be configured to communicate seamlessly over the internet, establishing an interconnected, holistic system that addresses a myriad of communication and operational requirements.

A launch deck can facilitate three phases of a process: provisioning, deployment, and management. The launch deck can do so in a manner that is easy for civil engineers, or others, to use without the need for specialized IT skills. The detailed features and functionality of the launch deck can be modified or configured according to specific user needs and/or requirements. This flexibility can allow the system to cater to a broad range of needs in the management and update of remote devices.

A system and method for automating deployment of customer infrastructure can be based on a desired state configuration. The system can provide an encapsulated CMDB and/or IPAM to allow for automation of multiple services using, for example, inheritance of the CMDB. An advanced knowledge base orchestrator can execute functions without requiring an IT engineer, enabling non-technical personnel to deploy complex, IT-driven implementations through a portal. The system further automates the deployment of customer infrastructure from onboarding to end device deployment, ensuring that each device has the desired configuration. A messaging bus enables communication across technology stacks, keeping downstream products aware of any changes in the CMDB. The system improves the efficiency and accuracy of site deployments while reducing the need for technical expertise.

An embodiment of the present invention can include a software platform designed to facilitate provisioning and registration. During an initial phase, a router, or device, can be provisioned. This phase allows the civil engineer or any other user to access the platform through the launch deck, using their user credentials.

The launch deck feature can include an endpoint onboarding workflow, allowing the user to register the required endpoints easily. To further assist with the registration process, this feature is equipped with an active learning system. This system can be capable of discovering new devices and determining their suitability for registration, providing a comprehensive and intuitive onboarding process for the user.

The software platform can also facilitate the deployment and authentication of endpoints. For example, once the endpoints are registered, the civil engineer can decide on the number and placement of these endpoints. These endpoints, which may be network-capable devices such as traffic lights, radars, sensors, or cameras, can be connected to the network via Ethernet or other suitable networking solutions.

As part of the authentication process, the device can be designed to perform Media Access Control (MAC) address-based authentication, also known as MAB authentication. In this context, the MAC address of the endpoint, a unique identifier preset by the device's manufacturer, is used as the Auth0 credential.

Given that MAC addresses can be spoofed, the system can incorporate an authentication, authorization, and accounting (AAA) server, such as a RADIUS AAA server or a Cisco Identity Services Engine (ISE) server, to ensure the network's integrity. The Cisco ISE server can validate the credential by sending TCP messages and performing other steps based on the fact that different operating systems respond uniquely to these steps, thereby enabling the system to verify the legitimacy of the endpoint.

Figure 2:
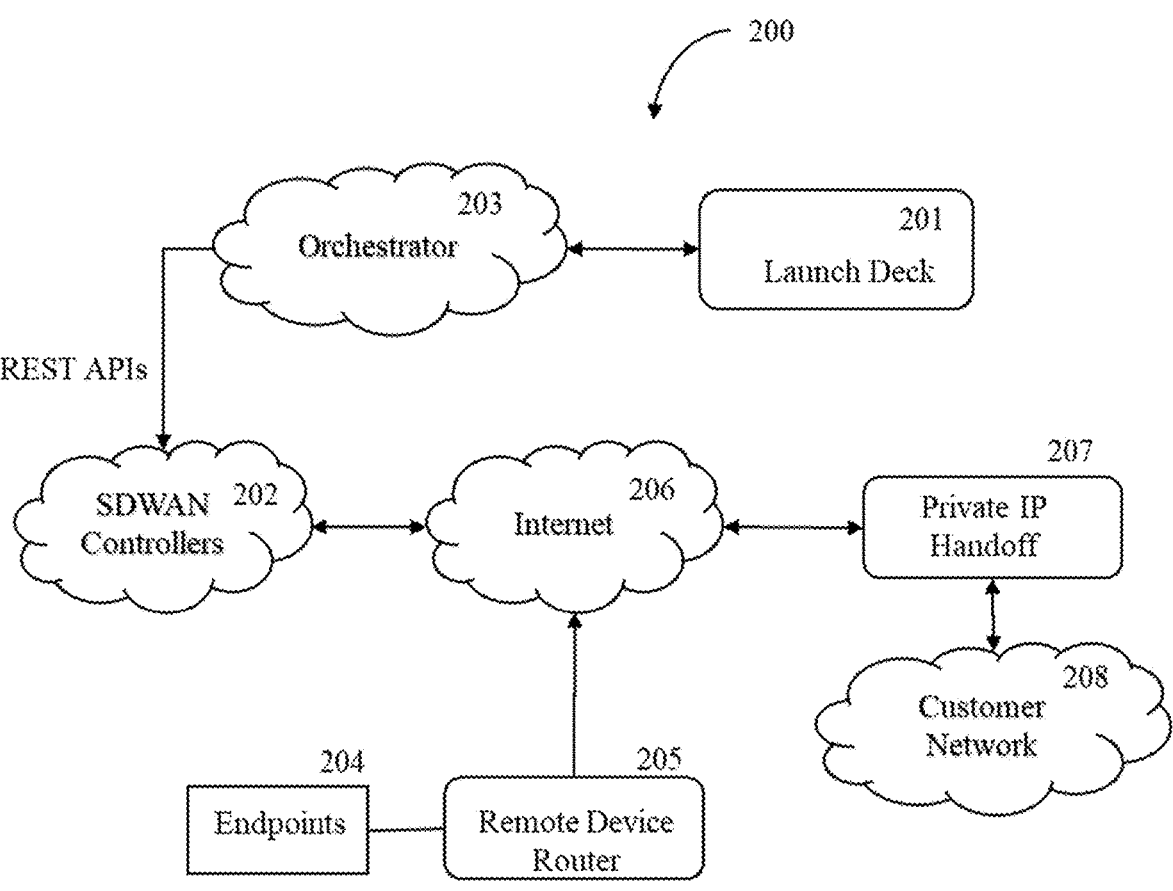
FIG. 2 illustrates a platform system embodiment.

FIG. 2 illustrates an exemplary system embodiment (200). The system can include a launch deck (201), SDWAN controllers (202), orchestrators (203), remote device routers (205), and endpoints (204). The elements can communicate directly or through the internet (206).

A launch deck (201) can include various tools, libraries, and subroutines, including a frontend, an API portal, CMDBs, message logging, directories, cloud services, an ingress gateway, relational database management system (RDBMS), PnP orchestrator, secure vaults, firewalls, and other database and server tools.

The endpoints (204) can be various devices, such as remote worker endpoints, remote sensors, vehicle sensors, cameras, traffic lights and/or signs, branch endpoints, etc. The endpoints can be connected to corresponding remote device routers (205), such as Cisco CG113 for teleworker devices, Cisco IRA1835 for fleets (e.g. vehicle sensors and/or cameras), Cisco IRA1101 for roadway lights and/or signs, Cisco Cat1100 for branch endpoints, etc.

The SDWAN controllers (202) can include a network management system (NMS) configured to manage the endpoints and/or routers. Various tools can be configured to implements an NMS, such a vManage, vSmart, and vBond.

The orchestrator (203) can be implemented local to a system and/or in cloud environments. An orchestrator can include network-wide security policy enforcement. By way of example, various tools can be configured to provide the orchestrator functionality, such as an ISE cluster, and ISE orchestrator Azure Kubernetes Service, and a vManage orchestrator. The orchestrator can be connected to the internet via ordinary means, such as via switches like Catalyst 8000 or Cat8k.

A user, not shown, can connect to the system via the internet (206) to, for example, provision, maintain, update, and/or check the status of endpoints (204). For a user or a group of users (such as a customer company), the system can include a customer network (208). The network can include storage for the user and can be walled off, via a private IP handoff (207) from the rest of the system to ensure user security and privacy. A private IP handoff can allow the transfer or exchange of network traffic between two different networks or systems using a private IP address space. The IP addresses used for this transfer can belong to ranges of IP addresses reserved for use within private networks. These addresses can be non-routable through the public internet to improve security by keeping the traffic isolated from other networks.

By way of specific examples of embodiments, endpoints can be provisioned. The provisioning process can necessitate authentication of an end user through a web browser, which may be accessed on various platforms including personal computers and mobile devices. A launch deck portal can be utilized as a comprehensive tool designed for end users, facilitating effective management of an inventory catalog of duly authorized devices. An advanced capability of this system is its dynamic inventory discovery feature, synergizing with platforms such as Cisco ISE and Cisco CyberVision. This integrative feature can allow end users the aptitude to select and authorize discovered endpoints directly through the launch deck portal.

Figure 3:
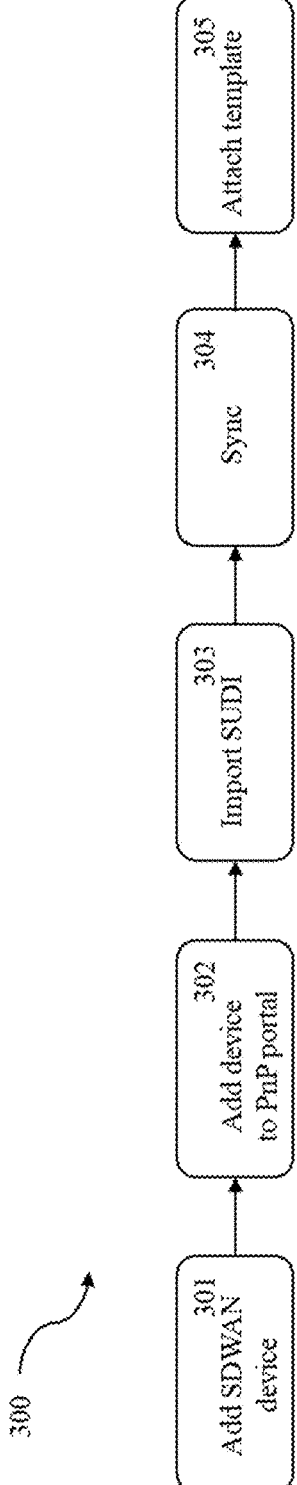
FIG. 3 illustrates a flowchart of device deployment.

FIG. 3 illustrates a flowchart (300) or a customer journey map through a device deployment process, indicating where and how data is transferred to the CMDB and, subsequently, how it's consumed on the other side by systems, such as Kafka. Via a launch deck dashboard, an SDWAN device can be created (301) in the centralized management platform. By way of example, VManage a centralized management platform designed for overseeing networks especially software-defined networks, can be utilized. The platform can be configured to provide users with a unified dashboard to configure, monitor, and manage various network devices, policies, and connectivity features. Its interface can be configured such that users can deploy network configurations, monitor network health and traffic patterns, troubleshoot issues, and ensure consistent policy application across the network. The platform can also be configured to facilitate the automation and orchestration of network services, simplifying the management of complex, multi-site deployments.

The SDWAN device can be added to a plug-and-play (PnP) portal for devices (302). According to user or designer preference, such registration can be performed automatically when a physical device is ordered from a manufacturer or supplier, or manually by a user after receiving the physical device. The PnP agent can be an embedded software application running on Cisco routers, switches, wireless access points, and sensors. It can be configured to enable zero-touch provisioning by automatically starting on boot up for new or factory reset devices and by automatically discovering the PnP server. Device definitions from PnP can utilize a Secure Unique Device Identifier (SUDI) based on the manufacturer-installed certificate's serial number. The imported SUDI is a unique identifier associated with a device, which is securely embedded or integrated into the device, often during the manufacturing process. A SUDI can include a hardware-embedded certificate and can be critical for security procedures like secure boot or zero-touch provisioning to verify the legitimacy of the device. The SUDI can be imported by a manufacturer at the time or order or imported by an end-user.

The platform can synchronize (304) the inventory of devices against the PnP portal virtual account. After creation of the device, adding the device to the PnP portal, importing verification information, such as its SUDI, and synchronization, the device is available for attaching a template (305) defining how the device is to be configured and/or how policies apply to the device.

Figure 4:
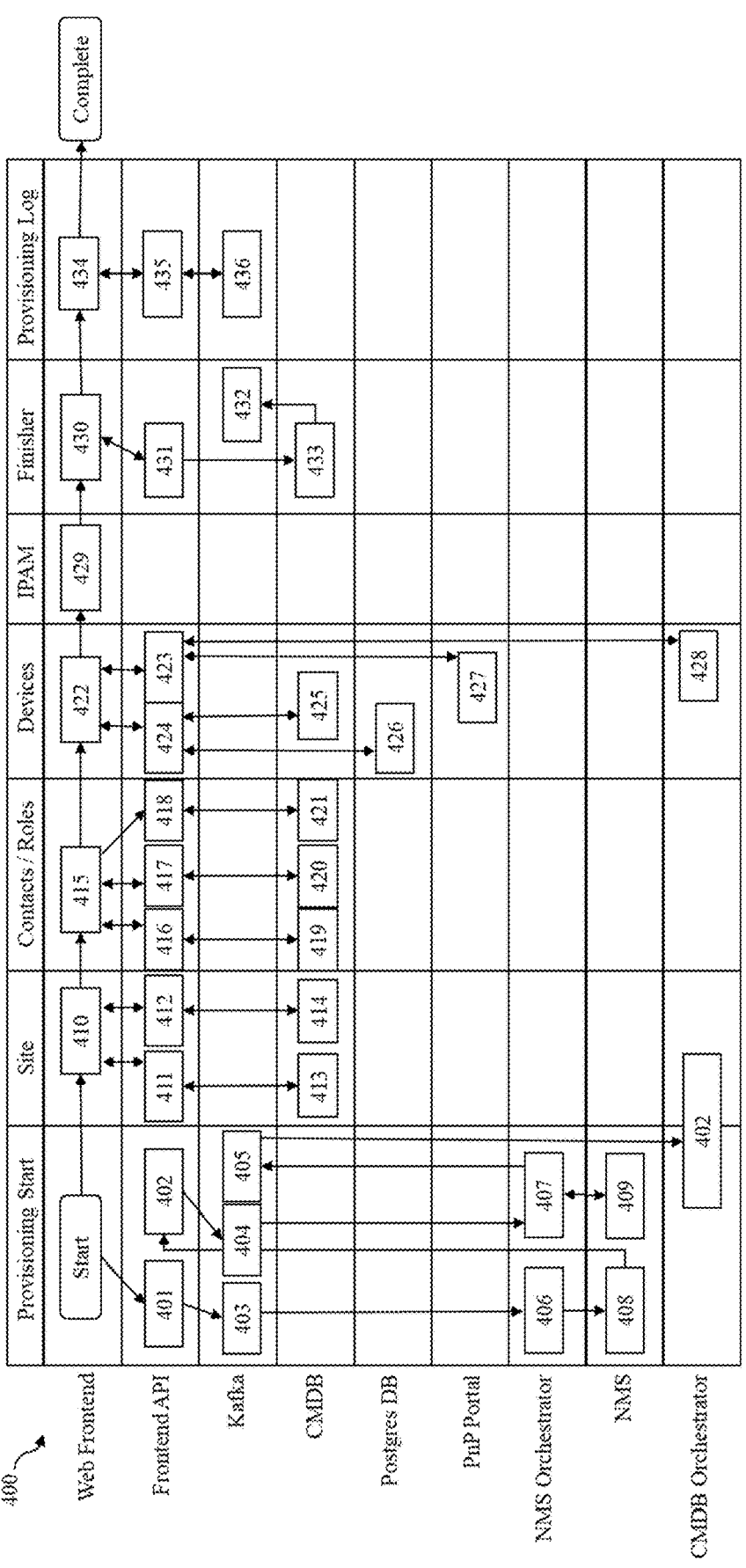
FIG. 4 illustrates a flowchart of a provisioning method embodiment.

FIG. 4 illustrates a nine-layer swim lane flowchart for provisioning in an exemplary embodiment (400) through an integrated web frontend and backend process. At the commencement, a user can initiate the provisioning process via the web frontend. This action directs the system to interact with the frontend API layer by accessing the/sdwan/start endpoint (401). Subsequent to this, the system orchestrates a synchronization command (403), aiming to harmonize data across different layers. This synchronization can be implemented (406, 408) between the network management system (NMS) orchestrator and the Plug-and-Play (PnP) portal, utilizing an orchestrator.

Upon successful synchronization, the frontend API receives a notification through a webhook (402), signaling the conclusion of the synchronization job. This triggers the system to solicit the current inventory, prompting another synchronization command (404) between the NMS and PnP (407, 409)). The resultant data, upon being fetched, can be relayed as a response (405) to the user. Concurrently, the inventory data can undergo an update (402) in the configuration management database (CMDB) orchestrator.

Navigating forward in FIG. 4, the user can be directed to a 'select site page' (410) on the frontend. The system can invoke a decision point: the option to utilize an existing site or to create a new one. A frontend API call, e.g. "/sdwan/inventory/sites", (411) can return sites for an organization from the CMDB. This interface request can obtain a list of sites from the system's inventory, serving as an intermediary that conveys user requests from the frontend to data-fetching operations in the backend. An operation (413) can communicates with the CMDB regarding details about an organization's assets to retrieve and/or extract site-related information from the CMDB. Such communications can be two-way interactions between the frontend API and the CMDB, establishing a continuous flow of data, particularly site information. When a request is initiated on the frontend, it can be relayed to the CMDB. Once the CMDB processes such a request, the relevant site data can be returned to be presented or further utilized on the frontend.

If not using an existing site, a new site model can be created. A call, e.g. "/create/site" (412) can be sent to the CMDB (414) to create a new site and associate the site with necessary and/or pertinent data, for example, a region. Within the contact management module, new roles can be associated with contacts for a delineated site. The system, in its backend processes, can fetch contacts and roles for a specified site. It can provide an exhaustive view of all available roles for the user's perusal.

On the other hand, using an existing site leads to manage contacts (415) associated with the chosen site. A frontend API call, e.g. "/contacts/site", (416) can return contacts and roles for an organization from the CMDB. This interface request can obtain a list from the system's inventory. An operation (419) can communicates with the CMDB regarding details about an organization's contacts and roles for specific sites. A frontend API call, e.g. "/contacts/roles", (417) can return various roles for the organization's endpoints from the CMDB. This interface request can obtain a list of all roles available from the system's inventory through, e.g., an operation (420) that can communicate with the CMDB regarding details about roles. A frontend API call, e.g. "/associate/contact/role", (418) can initiate an assignment regarding devices. This interface request can cause an assignment (421) in the CMDB of a new contact to the role and to the site.

Transitioning to the next phase, the system and/or user can select a device for provisioning (422). The subroutine can query whether to create a new device, which can include an API call, such as "/available/inventory", (424) to return passport product details (426). Here, the system, leveraging the CMDB, can procure a list of available inventory (425), showcasing unassigned devices and their pertinent product details. Within the framework, users can be provided direction to create a new device. An API call, such as "/createDevice", (423) can prompt a PnP device subroutine (427). Steps in the PnP device subroutine can include various orchestrator routines (428) such as adding a serial number to an orchestrator job queue, the orchestrator pushing the serial number to the PnP portal, and/or pushing an NMS synch job onto command topics. In scenarios where the newly inputted device lacks a model in the PnP portal, the system can notify the user, suggesting rectifications in the PnP portal inventory. When the device has a match in the PnP, the system and/or user can be navigated to specify the desired number of such devices for the provisioning process.

An IP Address Management (IPAM) routine (429) can manage and track the IP addresses used by provisioned endpoints. This can facilitate the planning, tracking, and management of the IP address space used in the network. It can serve as the central authority for IP address allocations, enabling users to organize and understand which IP addresses are in use and which are available for allocation. IPAM tools can assist in the creation and management of subnets by allocating address blocks and keeping a clear, up-to-date record of these allocations, thereby helping to prevent IP address conflicts. IPAM (429) can integrate closely with Dynamic Host Configuration Protocol (DHCP) and Domain Name System (DNS) services, allowing for automatic updates of records when DHCP leases are created or expired and when DNS entries are added or removed. Furthermore, it can support policy enforcement related to IP address allocations, ensure security by monitoring for unusual network behavior, and aid compliance with various regulations through detailed record-keeping.

Concluding various of the aforementioned can lead to finishing routines (430). A frontend API call, e.g. "/Finisher", (431) can initiate the system executing a gamut of CMDB actions (433). Such actions can include tasks like generating novel prefixes for networks, formulating Autonomous System Numbers (ASNs), allocating IP addresses for specific interfaces (e.g., vlan1, system, loopback), linking these IP addresses to the pertinent interface, marking the device's status in the CMDB as provisioned, and subsequently relaying this data back to the user. The system can post finishing events to designated event topic (432), ensuring a comprehensive logging mechanism. A finisher module can include means for marking a device in the CMDB as provisioned. Such means can include a subroutine utilizing, e.g., MAC address, device fingerprinting, serial number, hashing, token-based ID, timestamp and sequence, hardware security modules (HSMs), IP address tracking, and/or OAuth tokens.

Provisioning logs can be created. For example, all or a subset of event logs can be read (434). A frontend API call, e.g. "/Events", (435) can initiate the writing of events to a job log topic (436). Additionally, an interface can be made available to the user to peruse event logs, which can be sourced from a dedicated job log topic.

The culmination of actions can result in the system presenting a definitive output to the user in the form of provisioned endpoints and/or status codes regarding completion of the device provisioning process.

By way of further example, an alternative embodiment can be designed for handling SDWAN device onboarding and provisioning. The system functionality includes the various roles assigned, and it sets the maximum number of devices.

Initially, a provisioner traverses through sites. To add an SDWAN device to a network management system (NMS) such as VManage, the device must be added first to the Cisco Plug and Play (P&P) portal. This requires the device to have a unique device identifier, derived from a certificate's serial number. This identification process is a prerequisite to deploy any device in an SDWAN environment.

Upon correct ordering, devices (e.g., routers) are added automatically to the customer inventory. If the right virtual account and smart account from Cisco are linked, the device can be located in the P&P portal and imported by Cisco, smoothing out the process. However, if the device is not ordered with the original intention of deploying it in SDWAN mode, or if it is not associated with the right accounts, additional manual steps are necessary.

The method can reconcile the onboarding of the device to the VManage inventory. If the device is not already in the inventory, the workflow can ensure its addition to the portal while confirming the accuracy of the certificate serial number. The method can provide detailed information to the user regarding next steps, especially for edge cases that the automatic process can't handle.

The method can facilitate site selection, communicating with an API on the portal, and then to CNBB (Cisco Network Building Blocks), which stores the customer data. The communication path can extend to the context page of the portal API and the CNBB.

Subsequently, the user selects the device(s) for provisioning. The number of devices also communicates with the IP Address Management (IPAM) system within the CNBB. The process culminates with a 'finisher' function, which compiles all the data collected, ensures real-time data association, and executes the necessary changes.

The finisher function triggers subfunctions that handle various tasks such as network association, IP interfaces alignment, router site alignment within CNBB, creation of an Autonomous System Number (ASN) for the site, allocation of SDWAN system IP addresses, and alteration of workflow state. This allows the ingress gateway to recognize the readiness of the device for inclusion in the indent list.

Before sending the device and its configuration context to the orchestrator, the finisher ensures all prerequisites are met. This function serves to consolidate and enact the requisite changes in the CNBB for provisioning.

Each step of the workflow corresponds to a function executing a specific logic, enabling the method to handle a range of scenarios, including edge cases. This comprehensive and adaptable approach allows for efficient onboarding and provisioning of SDWAN devices.

The invention includes a Complex Network Building Block (CNBB), utilized for modeling a network. This CNBB operates with a unique postscript database for each customer, combined with an open-source Web Interface API extensively developed by network engineers involved in network automation. The API for this project boasts the most comprehensive collection of tools for modeling data networks, thus forming the backbone of our customer environment data model.

One aspect of this data model is the configuration context. The configuration context can be a block of JSON data. Devices can have a local configuration context, and other contexts can be associated with various data structures. For example, these contexts could correspond to a template for a device in VManage, the primary controller used by Cisco, which uses these templates to define the application of policies on devices. During template construction, specific fields can be assigned variable values, necessitating the input of certain data to onboard a device to this template.

The configuration context can map these input values to their corresponding template fields, effectively serving as the binding element between the CNBB and the VManage template. These contexts can be local or global, and they can be associated with different constructs within the CNBB.

The association of the configuration context within the CNBB can occur hierarchically. For instance, configuration contexts associated with a particular region automatically apply to any sites added to that region. The regional configuration context then merges with other contexts from various data constructs or the device's local context. This combined context is known as the 'render configuration context.'

A template for VManage, for example, includes GPS information from the local context, which is combined with a GLE router configuration context. All these different elements, along with other configuration contexts, are merged to define the device's configuration. This unified structure helps to transform and map the necessary data from the CNBB to the SD-WAN template.

The CNBB definitions exist within a high-level database situated above the application. This database can drive the deployment infrastructure for orchestrators and the creation of configuration contexts in the CNBB, facilitating the management of organizational structures. It includes tables for configuration contexts, context templates, template fields, device model compatibilities, and module requirements for templates to function. Each time an update or change is made to these tables, it triggers a 'complete context update' function that collates this information into a unified JSON structure and updates the configuration context in the CNBB.

The orchestrator, a component within the customer environment, recognizes its unique ID and listens to specific events related to that organization. The orchestrator determines which actions it needs to execute based on the incoming data from the Kafka topic.

A loosely coupled design can allow for the addition of orchestrators and functionality without the need to change the ingress gateway code. A user change on the front-end reflects the intended state, much like a painting by Bob Ross.

The CNBB is the ideal vision (or intended state), which the system can translate into a tangible reality.

The system can utilize webhooks, a process where an event in one system triggers an action in another. For instance, any modification to the data types within the CNBB (creation, update, or deletion) triggers a REST request to a specific URL via an HTTP post. This post contains a copy of the modified object and is encrypted to ensure it can be validated as originating from a trusted source. This mechanism serves as an efficient way for one application to notify another application of an event or change.

Authentication and Authorization. For the operational phase, there is a provision for logging, which can be accessed through contemporary messaging applications such as Teams, WebEx, and the like. The operational process can be initiated with device authentication and authorization, for example via Cisco ISE. Authentication can employ the device's MAC address as the primary credential. Nevertheless, the validity of this credential hinges upon a detailed profiling of the endpoint. The device, in its quest for authentication, can engage in a MAC Address Bypass (MAB) authentication mechanism. This can involve transmitting the device's MAC address to the Cisco ISE server, a system which functions based on the RADIUS AAA server protocol. Upon receiving the MAC address, the Cisco ISE server undertakes the task of referencing this MAC address within its intrinsic database. This reconnaissance aids in discerning whether the MAC address belongs to a specific endpoint group. Such endpoint groups may be configured to dictate particular endpoint profiles that are eligible for alignment with this group. To bolster the accuracy and security of this procedure, additional features like DHCP snooping and port scans can be incorporated. This can ensure the endpoint's profile correlates with the identity the MAC address portrays. An in-depth verification process can be invoked wherein, for example, the authorization policy cross-references the endpoint's access credentials specific to a site. This can be crucial in multi-networked sites to ascertain the network to which the endpoint rightly belongs. Subsequent to the successful completion of authentication and authorization checks, the AAA server can convey the resultant data back to the initial device. When the device is in receipt of these results, it can enforce the stipulated security policy. If the situation warrants, the endpoint can be systematically placed within the appropriate network.

Figure 5:
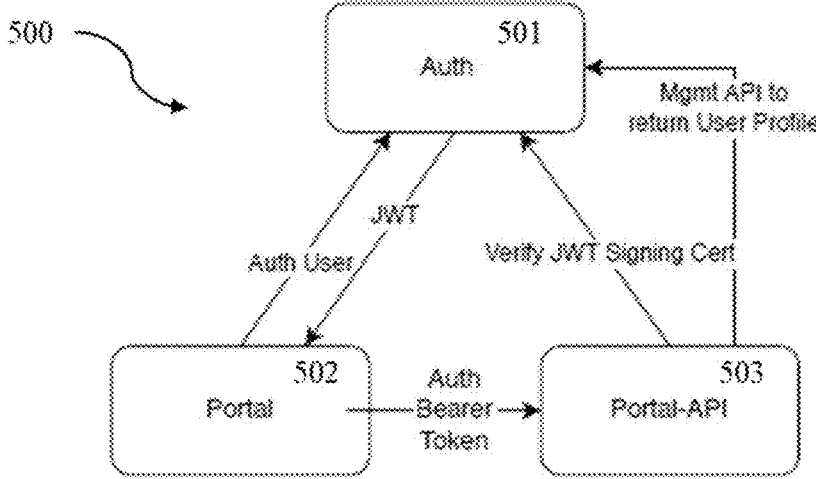
FIG. 5 illustrates authentication submodules of an authentication and authorization process.

FIG. 5 illustrates authentication submodules for accessing a system platform. The diagram outlines a secure user authentication and authorization process (500), involving an authentication service (501), a user interface application or portal (502), and a backend API service or portal-API (503).

The process can begin with an authentication service (501). This service can be responsible for verifying the user's identity. When a user attempts to log in, they must provide credentials to this service. After successful authentication of the user's credentials, the authentication service can generate a JSON Web Token (JWT). The JWT is a compact, URL-safe means of representing claims between two parties. In this context, the claims can be, for example, the user's identity, roles, and/or permissions, as well as various metadata. The generated JWT can be sent from the authentication service (501) to the portal (502). The portal can represent the user interface or front-end application that the user interacts with.

Upon receiving the JWT from the authentication service, the portal initiates a process to authenticate the user within its context. This can involve the portal sending a request back to the authentication service to confirm that the JWT is valid and/or that the user is permitted to access the portal.

After the user is successfully authenticated in the portal, the portal generates an "auth bearer token". This token can be sent from the portal to the portal-API. The portal-API can represent the backend service or set of services that the portal communicates with to fetch or send data. The token can be used to authenticate and authorize API requests that the portal makes on behalf of the user. The portal-API must ensure that the received bearer token (which may be the JWT or another token generated by the portal) is valid. It can send a request to the authentication service to verify the signing certificate of the JWT.

In addition to validating the JWT, the portal-API (503) may need additional information about the user, such as their roles and permissions or other profile data. The portal-API can send a request to the authentication service to retrieve such user profile information.

Embodiments of the present invention pertain to the management of endpoints. In one embodiment, the system is designed to report the active and historical states of the device's connectivity to the end user via the launch deck portal. The report can include various relevant metrics. A user can log into the launch deck portal to access a CMDB. A frontend can load JSON static files to the user's browser enabling it to render the user interface. The user interface can check for an existing authentication token, such as a JWT from Auth0. If authentication is required, the user interface van redirect to Auth0 for authentication protocols. Upon successful authentication, a JWT can be provided to the user via the interface. This JWT can be a time-bound token encompassing a list of the RBAC permissions attributed to the user. To request the user's profile information from the launch deck platform, the user interface can initiate REST requests to a portal API. The Portal API can take the responsibility of validating the JWTs certificate signature. After validation, it can decode the JWT to link the RBAC permissions list to the user object. The portal API can inspect for an existing user record within a database, such as a Postgres database. If the user remains unidentified, a domain list can be examined for a domain associated with the user's email address, or other credentials. On finding a match, the portal API can generate a new user record and/or link it with the customer organization that corresponds to the identified domain. Post-establishing the user-organization linkage, the portal API can review the CMDB definitions for the organization. For every discovered CMDB, the portal API can establish a user object for the new-found user in the CMDB, produce an API token for the user's CMDB access, and/or position the user-specific API token within a secure vault designated for the customer, such as an Azure Vault. The token can become part of the user profile object, and its exposure can be restricted to only the portal API application. A sanitized version of the user profile can be delivered to the frontend. The user profile can encompass, for example, details about the organization and CMDB instance, but excluding the API tokens from being delivered back to the frontend. The frontend can activate features such as dashboards and/or device inventory pages by, for example, leveraging the received user profile details. As the frontend interacts with the portal API, either seeking objects from the CMDB or a Postgres database, the portal API can administer a permissions validation for each request. This can ensure adherence to the necessary RBAC permissions for specific actions (like GET, POST, PUT, DELETE). Concurrently, it can confirm organizational access to the targeted object using the relational capabilities of the backing Postgres database for the portal API.

Embodiments of the present invention relate to a process flow for managing changes in a CMDB and facilitating communication within a networked environment, especially within an organization's orchestrators. In an embodiment, whenever an alteration is detected within the CMDB, the CMDB can initiate the transmission of a webhook to an ingress gateway. Upon receipt, the ingress gateway is configured to deserialize the received webhook, converting it into a specific pydantic model. The ingress gateway can perform an evaluation on the properties of the modified device to determine whether the information needs transmission to the organization's orchestrators. If the device data satisfies the set qualifications, the ingress gateway executes the serialization of the pydantic class of the webhook event. This data can be transformed into a Kafka JSON schema that corresponds with one of the pre-established topic data structures. Following successful serialization, a message is produced onto an organization-specific event topic. For illustrative purposes, potential topics might be named "org-cspire-com-events" or "org-cust_name-com-events". Orchestrators, which may include VManage/ISE Orchestrators, associated with the organization, can operate on a localized Azure Kubernetes Service (AKS). The AKS can be situated within a customer-specific virtual network, for example in Azure.

Orchestrators can be configured to consume messages from the aforementioned organization-event-topic. Once consumed, the orchestrator deserializes the Kafka message, mapping it to its corresponding pydantic model, which can be found in predefined sources such as "kafka_topics.py". The orchestrator can examine a device's configuration context. If the metadata embedded within this context is deemed pertinent, the orchestrator can initiate event processing. As the initial step of event processing, the orchestrator can produce a "job_status" message. This message can be transmitted to a Kafka topic designated for the specific organization. By way of examples, essential information contained within this message can include job_id (which has its origins from the incoming webhook at the ingress gateway), status, type, source, object_type, object_id, user details, device serial number, device name, and/or comprehensive contents of the incoming Kafka message. Throughout the processing phase, any log entries generated by the system can be directed to the organization-device-logs topic. Each of these entries can be distinctly marked with the job_id, severity level, target audience, message content, and/or a data key that encapsulates a structured JSON format, which contains data pertinent to the specific log entry. The orchestrator can be designed to generate another job_status message upon completion of processing. Such messages can communicate a final outcome of a job and can be directed to an organization-specific device-jobs topic, which might, for illustration, be labeled as something like "org-cust_name-com-device-jobs".

In some embodiments, the technology stack can include various programming languages, frameworks, databases, front-end and back-end tools, and APIs. For example, the tech stack can include cloud infrastructure and containerization, data storage and security, secure remote access and analytics, a development environment, backend and frontend development, infrastructure for provisioning and management, and/or external services integration. This technology stack can provides a scalable, secure, and efficient environment for developing, deploying, and managing the application, while ensuring data integrity, accessibility, and performance.

In a preferred embodiment, the system can be built on a robust cloud infrastructure, utilizing containerization technology for efficient and reliable deployment of applications. For example, Kubernetes, a leading container orchestration platform, can be leveraged for managing and scaling the containers. The system can incorporate a private container registry for storing and managing container images, which facilitates consistent and controlled deployment of applications.

For storing data, the system can uses a distributed PostgreSQL database cluster that offers high availability and fault tolerance. A secure vault system can be integrated for managing bootstrap and runtime secrets needed by applications, ensuring that sensitive data is securely stored. The system can employ an identity provider to handle user authentication and authorization, thereby providing secure access control.

A bastion host can be deployed in the system to facilitate secure remote access for authorized users to a designated Linux jump box. Additionally, logging and analytics services can be integrated into the system to collect, store, and analyze operational data. For example, Grafana, a monitoring and visualization tool, can be used to present system metrics and performance data visually.

Various development environments can be utilized. For example, a developer can employ tools such as Visual Studio Code and/or Devspace.sh, which enable development and deployment of containers within individual namespaces in the active development environment. Other tools can be employ, such as a private source code repository, integrating version control and continuous integration/continuous deployment (CI/CD) pipelines for seamless building and deployment of containers. A backend can be developed using, for example, the FastAPI Python framework for a robust and efficient API development environment, along with SQLAlchemy, an ORM framework, to interact with the database. Database schema migrations can be managed using Alembic, automating the process of applying and managing schema changes. The frontend of the application can be developed with the Quasar Vue.js framework for a rich and responsive user interface. Nginx can act as an ingress controller, enabling external access to the application. Jetpack CertManager can automate generation and renewal of SSL/TLS certificates, ensuring secure communication.

A system can use Terraform for infrastructure provisioning and management, allowing the creation and deletion of resources like databases, Kubernetes clusters, permissions, and networking components. Crossplane can be employed to enable dynamic infrastructure deployment and management based on different organizational needs.

Embodiments of the present invention relate to a system and its capabilities for integration with diverse external services and platforms to enhance functionality and performance. In an embodiment, the system can be designed to seamlessly interface with a Kafka cluster. This integration allows the system to manage event streaming and messaging operations efficiently. The system can be coupled with an identity provider. This integration not only facilitates user authentication processes but also provides the advantage of single sign-on capabilities, streamlining user access and enhancing security. In another aspect of the described embodiment, the system has the capability to integrate with Cisco SDWAN and ISE. Such an integration can be instrumental in robust network management and bolstering security measures. Additionally, Postman can be employed for refining and validating the system's API functionalities. This tool can aid in both the testing and development of APIs, ensuring their optimal performance and reliability.

Although only examples, the foregoing technology stack can provide an optimized environment for the development, deployment, and management of the application, ensuring top-level performance, security, and scalability.

An important aspect of some embodiments is peering and private IP access, which can allow scaling with customer/user acquisition. This can be accomplished in part through Network Functions Virtualization (NFV) and/or Edge NFV (ENFV). An ENFV can be a device or server running software that performs network functions which would traditionally have been carried out by a separate, dedicated piece of hardware. ENFV based appliance can allow spinning up instances for each NMS instance that needs access to the MPLS network. This also allows deployment of redundant devices, e.g., at each datacenter. NMS instances can include shared instance, multi-tenant instance, and/or dedicated instance. A shared instance can be for customers/users who do not need or desire access via the NMS. For example, smaller commercial customers might want to choose this option. A multi-tenant instance may be more appropriate for customers that want access to the NMS. This would allow direct viewing and monitoring of their devices. For this option, the system can benefit from defined parameters around read-write or read-only access. a dedicated instance can be beneficial for customers who have regulatory requirements over the physical location of the NMS.

ENFV has several advantages. Because functions are software-based, they can be easily updated or changed without replacing hardware. It is easy to scale a function up or down based on demand. Reducing the need for specialized hardware can lower costs. General-purpose servers are often cheaper and can host multiple different functions. New functions can be deployed more quickly as software, without waiting for and installing new hardware. NFV can lead to more efficient use of resources, i.e. optimization, as functions can be dynamically allocated to servers based on demand, rather than being tied to a specific piece of hardware that might be under or over-utilized.

Figure 7:
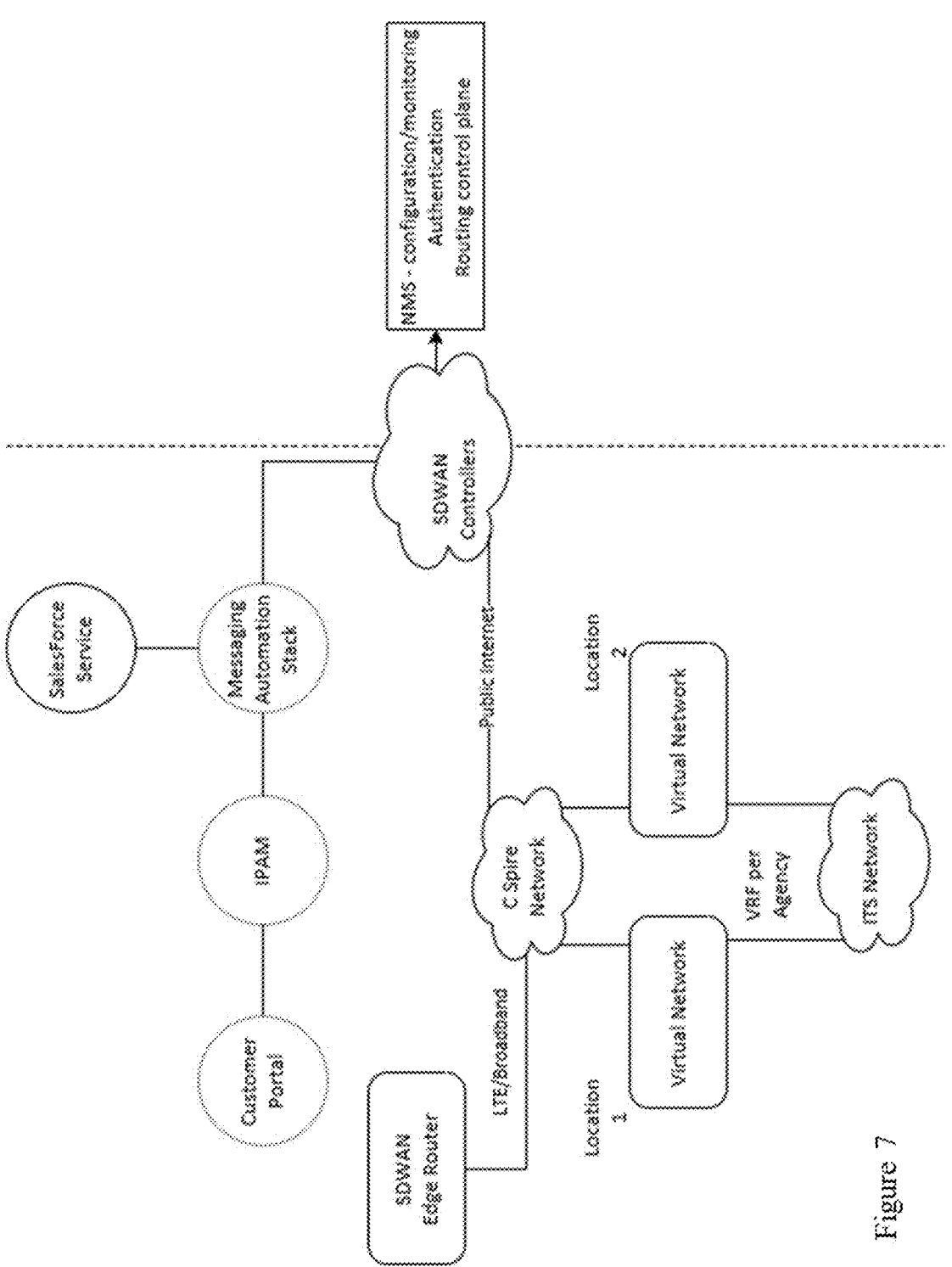
FIG. 7 illustrates an alternative system embodiment.

As suggested elsewhere herein, such as in FIG. 7, peering can be advantageously utilized through establishment of a networking relationship between separate networks, allowing them to directly exchange traffic, but in a manner that is restricted to private IP address spaces. This can enable distinct networks to interact with each other as though they were part of the same network, but only through designated, non-public (private) IP addresses. Peering can be conducted at an Internet Exchange Point (IXP) and/or directly between the networks over a dedicated data link.

Figure 6:
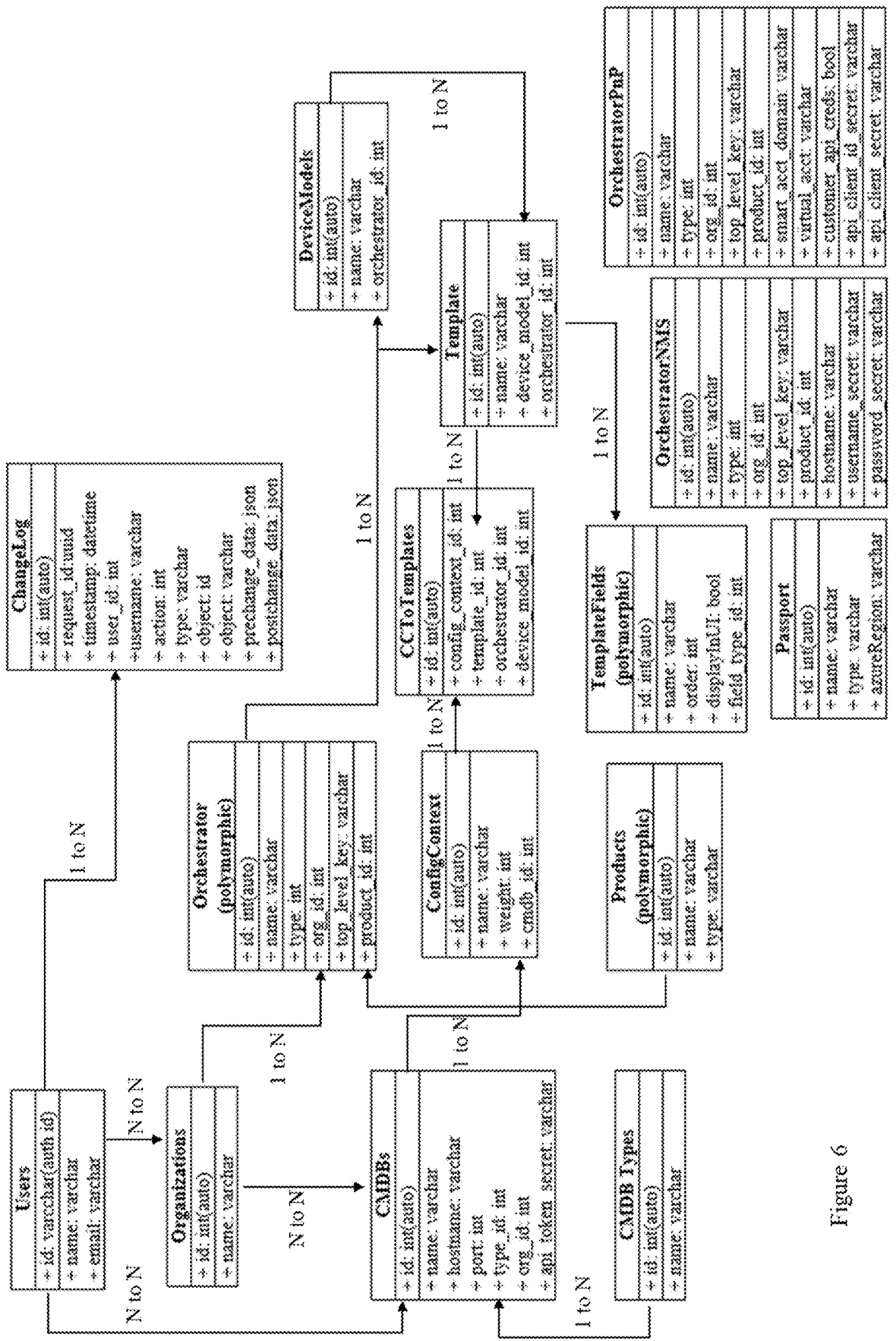
FIG. 6 illustrates the database design of an exemplary embodiment.

FIG. 6 illustrates a database design that encompasses entities and relationships for the management and integration of users, organizations, devices, and configurations. The database design can enable the structured and systematic organization of various data points for a system's operation, facilitating efficient data storage, retrieval, and management. Various elements of the database are displayed, such as Users, Organizations, Device Models, CMDBs, Orchestrator, Products, Configuration Context, CCToTemplates, and Change Log.

Orchestrator and Products are indicated as polymorphic, which can be a pattern that allows a table or a model to belong to more than one other type of table or model, enable a single table to store relationships to multiple tables, thus avoiding the need to use multiple tables to store these relationships. However, they need not be polymorphic and other entities can be polymorphically implemented as the user prefers. CCToTemplates, or Config Context to Templates, can be a table that establishes a relationship between Config Context entities and Template entities, as well as other entities such as Orchestrator and Device Models.

The Users entity can include a primary identification field designated as id of the datatype varchar, labeled as "auth id". Subsidiary attributes accompanying this primary identification are name and email, both characterized by the varchar datatype.

The Organizations entity is demarcated by a primary identifier, id with an integer type that auto-increments. Accompanying this identifier is the attribute name of datatype varchar.

The DeviceModels entity includes a primary identifier, id of type integer that auto-increments. Complementary to this primary identifier are attributes name of datatype varchar and orchestrator_id of integer type.

The CMDBs entity contains a primary identification field id that auto-increments. Associated fields include name, hostname, port, type_id, org_id, and api_token_secret.

The Orchestrator (polymorphic) entity is characterized by an auto-incrementing integer id. This entity comprises attributes such as name, type, org_id, top_level_key, and product_id.

The Products (polymorphic) entity has an auto-incrementing integer identifier id. This entity holds attributes like name and type.

The ConfigContext entity, alongside its primary identifier id that auto-increments, includes the attributes name, weight, and cmdb_id.

The CCToTemplates entity holds a primary identification field id that auto-increments. Associated attributes encompass config_context_id, template_id, orchestrator_id, and device_model_id.

The ChangeLog entity has its auto-incrementing primary identification id and spans multiple attributes, including but not limited to request_id, timestamp, user_id, username, action, and type.

The Passport entity has an auto-incrementing primary identifier id and associated fields like name, type, and azureRegion.

The Orchestrator NMS entity is defined by an auto-incrementing primary identifier id'. It encapsulates fields such as name, type, org_id, and top_level_key'.

The Orchestrator PnP entity mirrors the structure of the Orchestrator NMS but with variations in attributes.

In terms of relationships, a many-to-many relationship is established between the Users and CMDBs through the id of the Users and the id of the CMDBs. A one-to-many connection is formed between the Users' id and the user_id of the ChangeLog. CMDB Types' id shares a one-to-many relationship with type_id of the CMDBs. Users and Organizations are connected via a many-to-many interaction. Organizations and CMDBs exhibit a many-to-many relationship. The id of Organizations is related one-to-many to org_id in Orchestrator (polymorphic). The id from Orchestrator (polymorphic) correlates one-to-many to orchestrator_id in DeviceModels and Template. The id in DeviceModels has a one-to-many relationship with device_model_id in Template. The primary identifier of Template maps one-to-many to template_id in CCToTemplates. Furthermore, there is a one-to-many relationship from Template to Template-Fields (polymorphic). The id in Products (polymorphic) is linked to product_id in Orchestrator (polymorphic). A one-to-many bond is established between id in CMDBs and cmdb_id in ConfigContext.

FIG. 7 illustrates an alternative system embodiment. The depicted embodiment represents a comprehensive and integrated networking system. It is designed to provide an automated, secure, and highly organized approach to network management and customer service interactions, with a clear, logical separation of components to enhance network security, integrity, and modularity.

The design of FIG. 7 includes a "Customer Portal," serving as the user interface through which users are enabled to manage their network services. This portal is interconnected with an "IP Address Management (IPAM)" module, which is responsible for the organization, tracking, and allocation of IP address spaces within the network.

The IPAM module is communicatively coupled to a "Messaging Automation Stack." This stack acts as an intermediary, processing customer requests from the IPAM and converting them into actionable tasks. This stack further integrates with a "SalesForce Service," tasked with managing customer interactions, service requests, and related tickets, thereby enhancing customer service response and efficiency.

The Messaging Automation Stack is communicatively connected to "SDWAN Controllers," key components of the system tasked with managing SDWAN functionalities. The design depicts a distinct dashed line through the SDWAN Controllers, representing a logical and/or functional separation within the system architecture. This demarcation signifies in the architecture differing levels of security measures, differing network domains, and/or separate management planes within the SDWAN Controllers.

On one side of the dashed line, the SDWAN Controllers are configured to interface with an external network, designated as "C Spire Network." The SDWAN Controllers manage connections via various network mediums, such as LTE and/or broadband, to an "SDWAN Edge Router." C Spire Network is depicted as being further linked to a virtual network at Location 1 and virtual network at Location 2, each of which can connect to a cloud, "ITS Network." The ITS Network is configured to establish separate Virtual Routing and Forwarding (VRF) instances per agency, thereby facilitating isolated and secure traffic management and routing for different organizational units or clients.

On the other side of the dashed line are components that are functionally and/or logically separated from the aforementioned elements. This side of the dashed line includes a square containing three critical elements: NMS, Authentication, and Routing Control Plane. The NMS component can be configured for network and endpoint configuration and monitoring functions. The Authentication component can be designed to securely manage the identity verification and access control for users or devices interfacing with the system. The Routing Control Plane can be tasked with overseeing the logical routing decisions and the propagation of routing information within the network.

Figure 8:
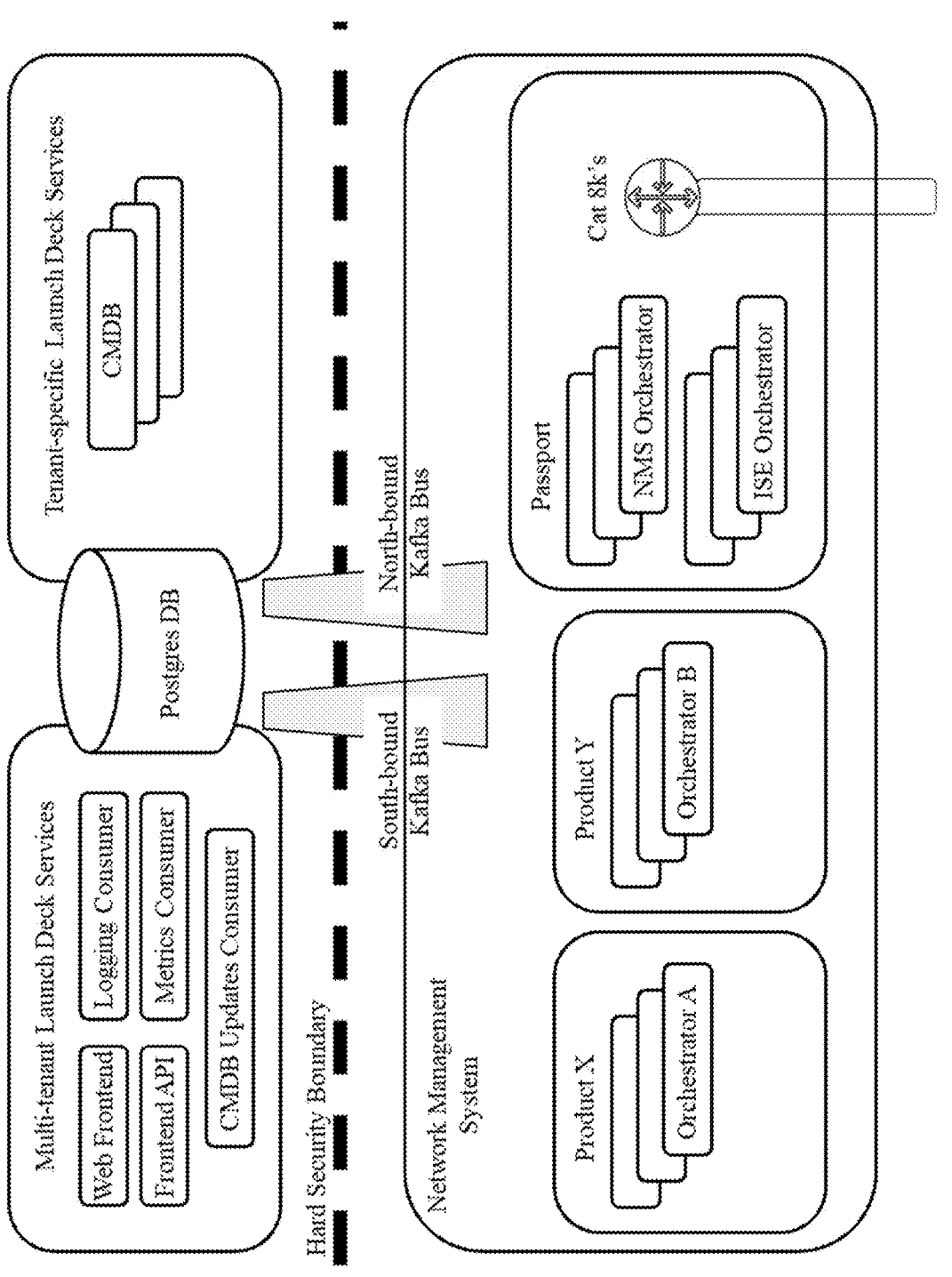
FIG. 8 illustrates the launch deck architecture of an exemplary embodiment.

FIG. 8 illustrates yet another embodiment in the form of a launch deck architecture. The system and method can decouple automation code from a core CMDB system, such as Netbox, and provide a cloud-native, multi-tenant, and automated delivery solution for managed devices and services. This decoupling allows for easier code upgrades and seamless managed service offerings for various entities, departments, and/or agencies, such as transportation departments.

Multi-tenant launch deck services can include a web frontend, a frontend API, logging consumer, metrics consumer, and a CMDB updates consumer. The system can include tenant-specific launch deck services, such as for the CMDB.

The system employs a persistent and immutable messaging queue system, exemplified herein by Kafka. A hard security boundary can separate the central database from the NMS with updates filtered down to Kafka bus messages. Kafka here serves as a message bus that connects various components of the system. Compared to lighter-weight, non-persistent messaging queues like Redis, Kafka can be configured to ensure that messages related to automation jobs are stored in an immutable log, preventing tampering with the data while in transit, providing audit trails, and preserving the data even if a process crashes. This log is maintained as a series of topics, with each topic acting similarly to a database table that is write-only, replicated, and persists, for example on disk.

In the embodiment of FIG. 8, Kafka's immutable log functionalities resemble those of a blockchain, providing a high degree of data integrity and security. In some embodiments, a blockchain can be utilized as the immutable ledger. Confluent Kafka can be utilized to avoid operational complexity of managing a Kafka deployment.

To make the logs more easily queryable, the system can include a component such as Kafka Connect. This component can act as a bridge between Kafka and a cloud-native database service, such as Azure Data Explorer (ADX) from Microsoft. Kafka Connect can be configured to stream data from Kafka's topics into ADX, which allows for efficient querying and data visualization, making it a suitable backend for dashboard interfaces that need to aggregate and display data from various sources, including CMDB data, metrics data, and log data.

The system can integrate an ISE. When a device connects to the network, the ISE receives the device's MAC address. The ISE then profiles the device and checks whether it belongs to a predefined endpoint group. Based on this profiling and grouping, the ISE applies an authorization policy, determining whether the device should have network access and to which specific network it should be connected.

In the case of a global change to policies, the ISE can dynamically update the authorization status of devices connected to the network. This can be managed on a per-customer basis, with one ISE cluster designated for each customer. If a policy change occurs that affects a device or group of devices, the ISE triggers a Change of Authorization (CoA) request, which is sent to the relevant network device(s), such as an SDWAN device. This device then either deauthenticates the endpoint or applies the new authorization policy accordingly.

Furthermore, the ISE can be configured to stream security events and dynamic authorization updates through a separate set of APIs, for example using a protocol such as Stomp. For instance, if an external security system, like CyberVision, detects an anomaly or potential security threat related to a device, it can send a deauthentication request to the ISE. This request can then be propagated to the relevant network device such as routers and endpoints, allowing the system to quickly respond to potential security threats by isolating or disabling the offending device.

Embodiments can take the form of hardware, software, or a combination of software and hardware. Embodiments can take the form of a computer-program product that includes computer-useable instructions embodied on one or more computer-readable media.

Such hardware can include a general-purpose computer, a server, network, and/or cloud infrastructure and can have internal and/or external memory for storing data and programs such as an operating system (e.g., DOS, Windows 2000™, Windows XP™, Windows NT™, Windows 7™, Windows 8™, Windows 8.1™, Windows 10™, OS/2, UNIX, Linux, Android, or iOS) and one or more application programs. Examples of application programs can include computer programs implementing the techniques described herein for customization, authoring applications (e.g., word processing programs, database programs, spreadsheet programs, or graphics programs) capable of generating documents or other electronic content; client applications (e.g., an Internet Service Provider (ISP) client, an e-mail client, short message service (SMS) client, or an instant messaging (IM) client) capable of communicating with devices, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The computer preferably includes input/output interfaces that enables wired or wireless connection to various devices. In one implementation, a processor-based system of the general-purpose computer can include a main memory, preferably random-access memory (RAM), and can also include secondary memory, which may be a tangible computer-readable medium. The tangible computer-readable medium memory can include, for example, a hard disk drive or a removable storage drive, a flash-based storage system or solid-state drive, a floppy disk drive, a magnetic tape drive, an optical disk drive (Blu-Ray, DVD, CD drive), magnetic tape, standalone RAM disks, drive, etc. The removable storage drive can read from or write to a removable storage medium. A removable storage medium can include a disk, magnetic tape, optical disk (Blu-Ray disc, DVD, CD) a memory card (CompactFlash card, Secure Digital card, Memory Stick), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface, a removable memory chip (such as an EPROM or flash memory) and associated socket, and other removable storage units and interfaces, which allow software and data to be transferred from the removable storage unit to the computer system.

The server can include the general-purpose computer discussed above or a series of containerized applications running on commodity or cloud-hosted hardware. A platform can be implemented within a network, for example, the Internet, the World Wide Web, WANs, LANs, analog or digital wired and wireless networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

All of the methods and systems disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

We claim:

1. An integrated network management system, comprising:
   a Configuration Management Database (CMDB) storage device configured to serve as a repository for endpoint configuration data;
   an Internet Protocol Address Management (IPAM) component configured to manage and allocate Internet Protocol (IP) addresses within a network;
   a security component, comprising an identity services engine, configured to enforce network security policies and to manage user and device access to the network;
   an Software Defined Wide Area Network (SDWAN) component configured to intelligently route traffic across the network based on predefined policies; and a user interface configured to provide a user with the ability to deploy endpoints and manage the network, wherein the CMDB, the IPAM component, the identity services engine, the SDWAN component, and the user interface are seamlessly integrated to create a unified, automated solution that allows for efficient network deployment and management by a civil engineer.

2. A system for network device provisioning and maintenance, comprising:
   a processor coupled to a memory;
   a web frontend;
   a frontend Application Programming Interface (API) interfacing the web frontend with a processing layer;
   a message queuing layer configured to asynchronously communicate with the processing layer;
   a Configuration Management Database (CMDB) storage device configured to store device data;
   a relational database configured to manage the CMDB;
   a plug-and-play (PnP) portal configured to manage an inventory;
   an orchestrator for a Network Management System (NMS), wherein the orchestrator is configured to handle commands and responses between the PnP portal and the NMS;
   wherein the NMS is configured to manage network configurations; and
   a Configuration Management Database (CMDB) orchestrator configured to coordinate data between the CMDB and the PnP portal.

3. The system of claim 2, wherein the web frontend includes a graphical user interface for selecting a site and associating contacts and roles with the site based on user input.

4. The system of claim 2, further comprising a finisher module, operatively connected to the web frontend, for finalizing the network device provisioning.

5. The system of claim 4, wherein the finalized device provisioning comprises generating and associating IP addresses with a network interface of a device.

6. The system of claim 4, wherein the finisher module includes means for marking a device in the CMDB as provisioned.

7. The system of claim 2, wherein the message queuing layer is configured to publish and subscribe to event topics, and wherein the system further comprises an event log reader operatively connected to the web frontend.

8. The system of claim 7, wherein the event log reader is configured to monitor provisioning events in real time.

9. The system of claim 7, wherein the event log reader is adapted to output a signal indicating when provisioning is complete.

10. The system of claim 2, wherein the CMDB is configured to store site, contact, and role data.

* * * * *